United States Patent [19]
Nikdel et al.

[11] Patent Number: 5,514,389
[45] Date of Patent: May 7, 1996

[54] SYSTEM AND METHOD FOR PASTEURIZING CITRUS JUICE USING MICROWAVE ENERGY

[75] Inventors: Seifollah Nikdel, Winter Haven, Fla.; Paul E. Burgener, Mississauga, Canada; Angelo C. Grillo, Boca Raton, Fla.

[73] Assignee: Florida Department of Citrus, Lake Alfred, Fla.

[21] Appl. No.: 322,828

[22] Filed: Oct. 13, 1994

[51] Int. Cl.⁶ .................. A23L 3/00; H05B 6/00
[52] U.S. Cl. .......... 426/231; 219/687; 219/701; 422/21; 426/241; 426/521
[58] Field of Search .................. 426/241, 231, 426/599, 243, 521, 522; 219/687, 688, 689, 692, 693, 701, 710; 422/21

[56] References Cited

U.S. PATENT DOCUMENTS

| | | | |
|---|---|---|---|
| 2,517,569 | 8/1950 | Huzenlaub | 99/155 |
| 2,585,970 | 2/1952 | Shaw | 99/221 |
| 2,833,657 | 5/1958 | Copson | 99/221 |
| 3,092,503 | 6/1963 | Gray | 99/217 |
| 4,358,652 | 11/1982 | Kaarup | 219/688 |
| 4,694,133 | 9/1987 | Le Viet | 219/10.55 |

*Primary Examiner*—George Yeung
*Attorney, Agent, or Firm*—Allen, Dyer, Doppelt, Franjola & Milbrath

[57] ABSTRACT

A system and method for pasteurizing citrus juice with the use of microwave energy provide a plurality of microwave chambers through which juice is continuously flowed, the sequential flowing permitting a gradual increase in juice temperature that is sufficient to pasteurize the juice but insufficient to cause a detectable loss of flavor.

27 Claims, 1 Drawing Sheet

SYSTEM AND METHOD FOR PASTEURIZING CITRUS JUICE USING MICROWAVE ENERGY

BACKGROUND OF THE INVENTION

1. Field of the Invention

The present invention relates to systems and methods for treating liquids and, more particularly, to systems and methods for pasteurizing citrus juice.

2. Description of Related Art

It has been known since the days of Pasteur that, in order to prevent contamination over time by harmful microorganisms, liquids can be heat treated. In addition, in fruit juices, the enzyme pectin methylesterase (PME) causes a loss of quality in the product during storage. Commercial steam pasteurization is typically performed by passing the product through a metal heat exchanger; however, degradation of the juice can occur if care is not taken to minimize the temperature differential between the metal walls of the heat exchanger and the center of the liquid.

Various systems and methods of achieving pasteurization have been disclosed, including those of Huzenlaub (U.S. Pat. No. 2,517,569) and Gray (U.S. Pat. No. 3,092,503), who teach the utilization of infrared heating for sterilization. Similarly, electromagnetic waves may be used to heat a liquid, as discussed by Shaw (U.S. Pat. No. 2,585,970), who teaches the use of waves of frequency 500–5000 MHz to excite a conductive cavity through which fluid is directed.

Microwave heating has also been proposed to inactivate enzymes and microorganisms in fruit juices by Copson (U.S. Pat. No. 2,833,657) and by Le Viet (U.S. Pat. No. 4,694,133). In the latter of these, a swirling of the liquid is induced to achieve more uniform heating. The use of microwave energy avoids some of the problems associated with heating to high temperatures, including loss of flavor. This is due in part to the fact that the radiant energy heats the juice directly without heating the chamber walls, thus avoiding heat-transfer films and permitting improved temperature control. In addition, less heat is lost to the environment, and rapid startup and shutdown are possible.

SUMMARY OF THE INVENTION

It is an object of the present invention to provide an improved system and method for pasteurizing liquids with the use of microwave energy.

It is an additional object to provide a system and method for pasteurizing liquids that avoids large temperature differentials during the process.

It is a further object to provide a system and method for pasteurizing liquids that improves the effective storage time of the liquid.

It is another object of the invention to provide a system and method for pasteurizing citrus juices that avoids loss of flavor over fresh-squeezed juice.

It is yet a further object to provide a system and method for pasteurizing citrus juices that inactivates enzymes and destroys microorganisms during processing.

These and other objects are attained with the use of the present invention, comprising a system and method for pasteurizing a liquid while retaining optimum flavor. Successful pilot tests were performed on orange juice that proved the efficacy of utilizing a single microwave chamber through which the liquid to be processed was continuously flowed. In these studies, it was shown that bacteria and PME could be reduced in concentration to levels permitting increased shelf life of the juice over nonpasteurized product. Taste tests indicated that there was no measurable loss of flavor over fresh-squeezed juice, an important criterion for a liquid to be commercially viable.

In order to improve cost effectiveness, ease of maintenance, and flexibility, a modular system was designed to utilize a plurality of microwave chambers. The method of the present invention thus comprises the steps of continuously flowing the liquid sequentially through a plurality of chambers and heating the interiors of the chambers with microwave energy to raise the temperature of the liquid to a predetermined final temperature. The total microwave power and resident time in the chambers are designed to be sufficient to pasteurize the liquid, and the rate of temperature increase in the liquid through the chambers are insufficient to cause a detectable loss of flavor in the liquid.

A further step, which improves the efficiency of the method, comprises exchanging heat between liquid entering the system and liquid exiting the system. The energy efficiency is attained by recapturing a large portion of the energy that had been used to heat the exiting fluid and imparting some of that heat to the entering fluid, thus requiring less of the microwave power.

In a preferred embodiment, the flowing step comprises flowing the liquid through tubing substantially transparent to microwave energy. Also in a preferred embodiment, the tubing within each chamber is formed into coils. This increases the potential volume of liquid within each chamber while simultaneously maintaining a maximum depth of liquid from the tubing wall. This technique minimizes the temperature gradient that can form in the liquid being heated, which is preferable to subjecting a large volume of liquid to microwave energy, wherein the liquid can have substantial temperature variations throughout the volume.

In a specific embodiment, the material of the tubing used comprises polypropylene.

The system of the present invention for pasteurizing a liquid while retaining optimum flavor comprises a plurality of chambers, each chamber having an interior, and means for continuously flowing the liquid sequentially through the chambers. In addition, the system comprises means for heating the interiors of the chambers with microwave energy to raise the temperature of the liquid to a predetermined final temperature. Also provided are means for controlling the total microwave power emitted by the heating means and means for controlling the flowing means to control the resident time of the liquid in the chambers. As for the method described above, the system is configured to that the microwave power and resident time are sufficient to pasteurize the liquid, and the subsequent rate of temperature increase in the liquid caused by the power and resident time within the chambers are insufficient to cause a detectable loss of flavor in the liquid.

In a preferred embodiment, the plurality of chambers comprises a first chamber and a final chamber, and the system further comprises heat-exchange means for exchanging heat between liquid entering the first chamber and liquid exiting the final chamber. The heat-exchange means is utilized to improve the efficiency of the system.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
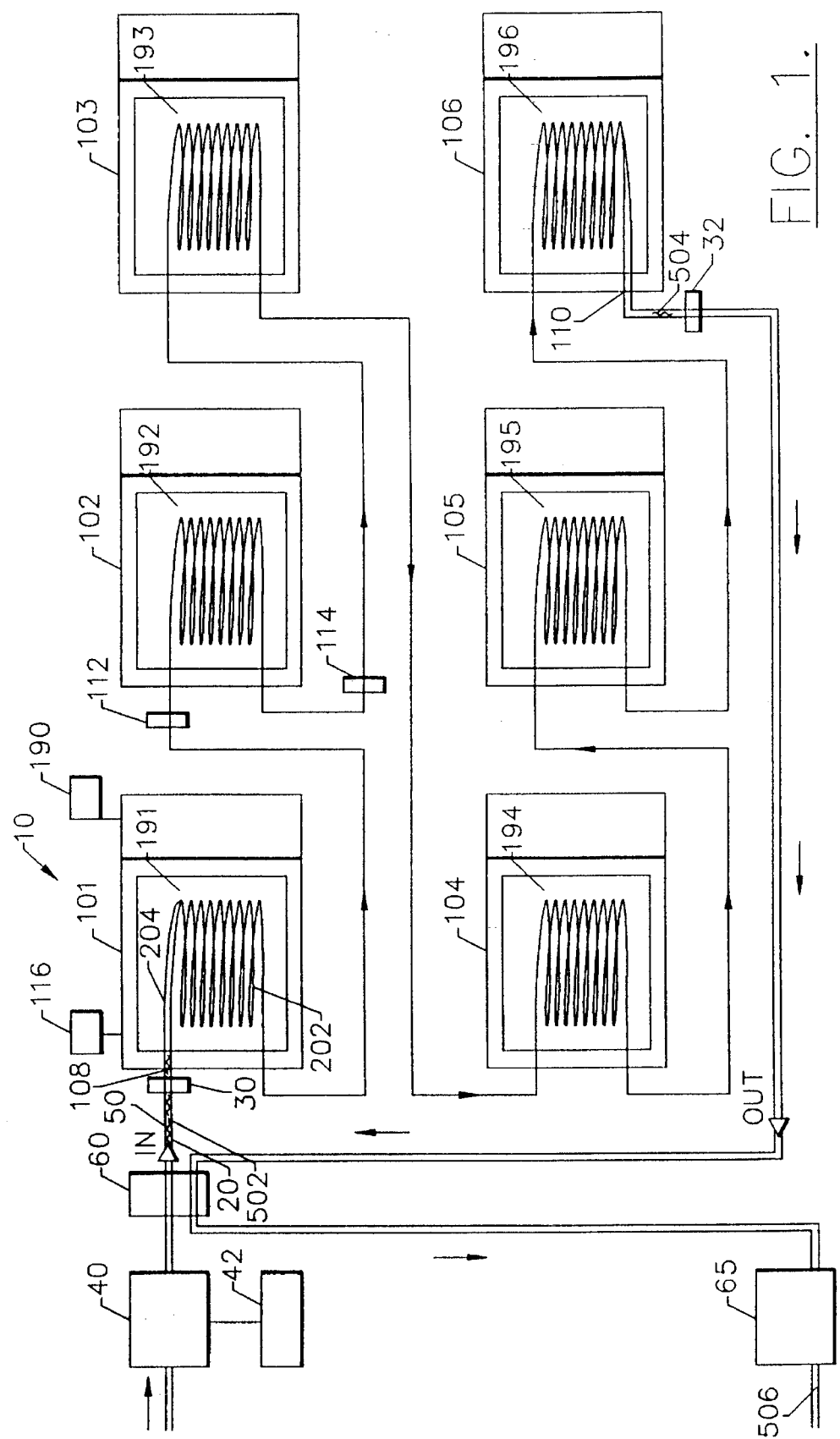
FIG. 1 illustrates an arrangement of an embodiment of the system and method for pasteurizing and disinfecting citrus juice.

A description of the preferred embodiments of the present invention will now be presented with reference to FIG. 1, wherein the system is designated by the reference numeral 10.

A preferred embodiment of the system and method disclosed herein comprises a system and method for pasteurizing, which inactivates unwanted enzymes, and disinfecting, to destroy microorganisms citrus juice 50 while retaining optimum flavor. The specific embodiment to be outlined is a system and method for pasteurizing orange juice, although this is not intended to limit the scope of the invention.

The steps of the method comprise continuously flowing the juice 50 through the system 10 of the present invention, the system 10 comprising at least six chambers 101–106 connected in series, each having an interior space 191–196, respectively. The first chamber is designated 101, and the final chamber, 106. In the embodiment tested, each microwave chamber comprised a Questron continuous-wave magnetron generating useful power output of 1000 W at 2450 MHz. A commercial-size unit requires larger units, typically 5000 W. The power emitted by each chamber 101–106 is also controllable via power controller 190.

The continuous flow is effected with the use of a pump 40, driven by a variable-speed motor 42. In the embodiment tested, the pump 40 is capable of pumping juice at 60 gallons per hour; however, commercial units typically pump at ten to a hundred times that rate, or 600–6000 gallons per hour. Additional control is attained with inlet 112 and outlet 114 valves fitted to each of the chambers 101–106 and shown in FIG. 1 on chamber 102. Each unit may also be activated/deactivated with on/off switch 116.

The juice 50 is pumped through the system 10 through tubing 20 substantially transparent to microwave energy, in a preferred embodiment comprising polypropylene having fiberglass cladding for insulation. In order to increase the potential volume of juice within each chamber while simultaneously maintaining a maximum depth of juice from the tubing wall 204, the tubing 20 within each chamber 101–106 is formed into coils 202. In the preferred embodiment, the tubing has an inner diameter of ⅜ inch, this diameter being selected to ensure that the microwave energy absorption by the liquid is less than 50%.

The interiors 191–196 of the chambers 101–106 are heated with microwave energy, in the preferred embodiment having a frequency of 2450 megahertz.

The temperature of the juice in the final chamber 106 is sensed with a sensor 32. Another sensor 30 senses the temperature of the entering juice at the entrance 108 of the system. In response to the sensed exiting temperature, the flow of the juice through the system is controlled in order to attain the desired final temperature of juice 50 in the final chamber 106. This desired final juice temperature is determined that is sufficiently high to inactivate undesirable microorganisms and enzymes, including bacteria and pectin methylesterase, and at the same time sufficiently low to avoid causing substantial deterioration of flavor. For the system and method for treating orange juice, the desired final temperature is in the range of 70 and 95 degrees centigrade. Specifically, for the preferred embodiment, the desired final temperature is in the range of 90 to 95 degrees centigrade.

In order to improve the efficiency of the system and method, a further step comprises exchanging heat between juice 502 entering the system 10 at the entrance 108 and juice 504 exiting the system 10 at exit 110. Specifically, if exiting juice 504 at a temperature in the range of 90 to 95 degrees centigrade is used to preheat entering juice 502 through the use of a heat exchanger such as a plate heat exchanger 60, the microwave power requirement is decreased from 30 to 6 kilowatts, indicating that 80% of the energy can be recaptured and used to preheat entering juice 502 without overheating it.

Following the heat-exchange step, the exiting juice 504 is chilled within cooler 65 to a predetermined storage temperature to improve the effective storage time of the juice 506. In the preferred embodiment, the predetermined storage temperature comprises a temperature of substantially 4 degrees centigrade.

The method and system of the present invention have been used to continuously pasteurize orange juice, the treated juice then being subjected to flavor and microbial activity tests. At a final exiting temperature of 90 degrees centigrade and a residence time of 8 seconds, PME was inactivated 100%, and bacteria were inactivated to less than the detection limit of less than 200 colony-forming units per milliliter when subjected to agar incubation at 30 degrees centigrade for 48 hours. Taste panel testing has indicated that the microwave treatment does not cause a detectable change in flavor over fresh-squeezed unpasteurized juice at the 99.9% significance level. No significant deterioration in flavor was noted for 90 days when the juice is maintained at 4 degrees centigrade following treatment.

It may be appreciated by one skilled in the art that additional embodiments may be contemplated, including the pasteurization and disinfection of milk, beer, and other fruit juices.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details of the system and steps outlined above.

Having now described the invention, the construction, the operation and use of preferred embodiment thereof, and the advantageous new and useful results obtained thereby, the new and useful constructions, and reasonable equivalents thereof obvious to those skilled in the art, are set forth in the appended claims.

What is claimed is:

1. A method for pasteurizing a liquid while retaining optimum flavor, the method comprising the steps of:

continuously flowing the liquid sequentially through a plurality of chambers having interiors; and heating the interiors of the chambers with microwave energy to raise the temperature of the liquid to a predetermined final temperature, the total microwave power and resident time in the chambers being sufficient to pasteurize the liquid, and the rate of temperature increase in the liquid through the chambers being insufficient to cause a detectable loss of flavor in the liquid.

2. The method recited in claim 1, further comprising exchanging heat between liquid entering a first chamber and liquid exiting a final chamber, the heat-exchange step improving the efficiency of the method.

3. The method recited in claim 1, wherein the flowing step comprises flowing the liquid through tubing substantially transparent to microwave energy.

4. The method recited in claim 3, wherein the tubing within each chamber is formed into coils, the tubing having a wall, thereby increasing the potential volume of liquid within each chamber while simultaneously maintaining a maximum depth of liquid from the tubing wall.

5. The method recited in claim 4, wherein the tubing comprises polypropylene.

6. A method for pasteurizing citrus juice while retaining optimum flavor, the method comprising the steps of:

continuously flowing the juice through a system comprising at least six chambers having interiors connected in series, one chamber comprising a final chamber;

determining a desired final juice temperature to be attained, the desired temperature determined to be sufficiently high to inactivate undesirable microorganisms and enzymes, including bacteria and pectin methylesterase, and sufficiently low to avoid causing substantial deterioration of flavor in the juice;

heating the interiors of the chambers with microwave energy;

sensing the temperature of the juice in the final chamber; and controlling the flow of the juice through the system in response to the sensed temperature in order to attain the desired final temperature of juice in the final chamber.

7. The method recited in claim 6, wherein the desired final temperature comprises a temperature between 70 and 95 degrees centigrade.

8. The method recited in claim 7, wherein the microwave energy comprises energy having a frequency of 2450 megahertz.

9. The method recited in claim 8, wherein the flowing step comprises flowing the liquid through tubing substantially transparent to microwave energy.

10. The method recited in claim 9, wherein the tubing within each chamber is formed into coils, the tubing having a wall, thereby increasing the potential volume of juice within each chamber while simultaneously maintaining a maximum depth of juice from the tubing wall.

11. The method recited in claim 10, wherein the tubing comprises polypropylene.

12. The method recited in claim 11, wherein the tubing further comprises fiberglass cladding for insulation.

13. The method recited in claim 12, further comprising the step of exchanging heat between juice entering a first chamber and juice exiting the final chamber, the heat-exchange step improving the efficiency of the method.

14. The method recited in claim 13, further comprising the step of chilling the exiting juice to a predetermined storage temperature to improve the effective storage time of the juice.

15. The method recited in claim 14, wherein the predetermined storage temperature comprises a temperature of substantially 4 degrees centigrade.

16. The method recited in claim 13, wherein the flowing step comprises flowing juice at a rate of 60 gallons per hour, the microwave energy comprises 6 kilowatts of heating energy, and the maximum desired temperature comprises a temperature in the range of 90 to 95 degrees centigrade.

17. A system for pasteurizing citrus juice while retaining optimum flavor, the system comprising:

means for continuously flowing the juice through at least six chambers connected in series, one chamber comprising a final chamber;

means for heating the interiors of the chambers with microwave energy;

means for sensing the temperature of the juice in the final chamber; and means for controlling the flow of the juice through the chambers in response to the sensed temperature in order to attain a desired final temperature of juice in the final chamber, the desired final juice temperature determined to be sufficiently high to inactivate undesirable microorganisms and enzymes, including bacteria and pectin methylesterase, and sufficiently low to avoid causing substantial deterioration of flavor.

18. The system recited in claim 17, wherein the flow controlling means comprises means for controlling the flow of the juice through the chambers in response to the sensed temperature in order to attain a temperature between 70 and 95 degrees centigrade of juice in the final chamber.

19. The system recited in claim 18, wherein the microwave energy comprises energy having a frequency of 2450 megahertz.

20. The system recited in claim 19, wherein the means for flowing comprises:

tubing substantially transparent to microwave energy; and means for pumping the juice through the tubing.

21. The system recited in claim 20, wherein the tubing has a wall and the tubing within each chamber is formed into a coil, thereby increasing the potential volume of juice within each chamber while simultaneously maintaining a maximum depth of juice from the tubing wall.

22. The system recited in claim 21, wherein the tubing comprises polypropylene.

23. The system recited in claim 22, wherein the tubing further comprises fiberglass cladding for insulation.

24. The system recited in claim 23, further comprising means for exchanging heat between juice entering the system and juice exiting the system, the heat-exchange means improving the efficiency of the system.

25. The system recited in claim 24, further comprising means for chilling the exiting juice to a predetermined storage temperature to improve the effective storage time of the juice.

26. The system recited in claim 25, wherein the means for chilling comprises means for chilling the exiting juice to a temperature of substantially 4 degrees centigrade.

27. The system recited in claim 26, wherein the means for flowing comprises pumping means for pumping juice at a rate of 60 gallons per hour, the microwave energy comprises 6 kilowatts of heating energy, and the final desired temperature comprises a temperature in the range of 90 to 95 degrees centigrade.

* * * * *

REEXAMINATION CERTIFICATE (3530th)
United States Patent [19]
Nikdel et al.

[11] B1 5,514,389
[45] Certificate Issued Jun. 2, 1998

[54] SYSTEM AND METHOD FOR PASTEURIZING CITRUS JUICE USING MICROWAVE ENERGY

[75] Inventors: Seifollah Nikdel, Winter Haven, Fla.; Paul E. Burgener, Mississauga, Canada; Angelo C. Grillo, Boca Raton, Fla.

[73] Assignee: Florida Dept. of Citrus, Lake Alfred, Fla.

Reexamination Request:
No. 90/004,631, May 13, 1997

Reexamination Certificate for:
Patent No.: 5,514,389
Issued: May 7, 1996
Appl. No.: 322,828
Filed: Oct. 13, 1994

[51] Int. Cl.$^6$ .................. A23L 3/00; H05B 6/00
[52] U.S. Cl. ............... 426/231; 219/687; 219/701; 422/21; 426/241; 426/521
[58] Field of Search .................. 426/231, 241, 426/243, 521, 599; 219/687, 688, 689, 692, 693, 701, 710; 422/21

[56] References Cited

U.S. PATENT DOCUMENTS

| | | | |
|---|---|---|---|
| 4,624,854 | 11/1986 | Naumann et al. | 426/233 |
| 4,808,782 | 2/1989 | Nakagawa et al. | 219/10.55 M |
| 4,962,298 | 10/1990 | Ferrari et al. | 219/10.55 A |

OTHER PUBLICATIONS

Chen, C.S.; Citrus Evaporator Technology, 1982 American Society of Agricultural Engineers, pp. 1457–1463.

Welch, Stanford Brett; The T.A.S.T.E. Evaporator, Continuing Progress in Evaporator Technology, Citrus Engineering Conference; Mar. 30, 1989.

Chen, Chin. S., Nikdel, S. and Miller, W.M.; Orange Juice Pasteurization with Microwave; The 1990 International Summer Meeting of the American Society of Agricultural Engineers, Jun. 24, 1990.

Prosetya, H. and Datta, A.; Batch Microwave Heating of Liquids: An Experimental Study; Journal of Microwave Power and Electromagnetic Energy, vol. 26, No. 4, 1991, pp. 215–226.

Chen, C.S., Nikdel, S., Parish M.E., MacKellar, D.G., Friedrich, L.; Pasteurization of Citrus Juice with Microwave Energy in a Continuous Flow Unit; 42nd Annual Citrus Processors' Meeting, Oct. 17, 1991.

Nikdel, Seifollah and MacKellar, Donald G.; A Microwave System for Continuous Pasteurization of Orange Juice; Proc. Fla. State Hort. Soc. 105:109–110, 1992.

MacKellar, D.G., Nikdel, S.; An Improved System for Flow Pasteurization of Citrus Juice with Microwave Energy; 43rd Annual Citrus Processors' Meeting; Oct. 21, 1992.

Nikdel, S., Chen, C., Parish, M., MacKellar, D., Fredrich, L.; Pasteurization of Citrus Juice with Microwave Energy in a Continuous–Flow Unit; Journal of Agricultural and Food Chemistry, Oct. 15, 1993.

*Primary Examiner*—George Yeung

[57] ABSTRACT

A system and method for pasteurizing citrus juice with the use of microwave energy provide a plurality of microwave chambers through which juice is continuously flowed, the sequential flowing permitting a gradual increase in juice temperature that is sufficient to pasteurize the juice but insufficient to cause a detectable loss of flavor.

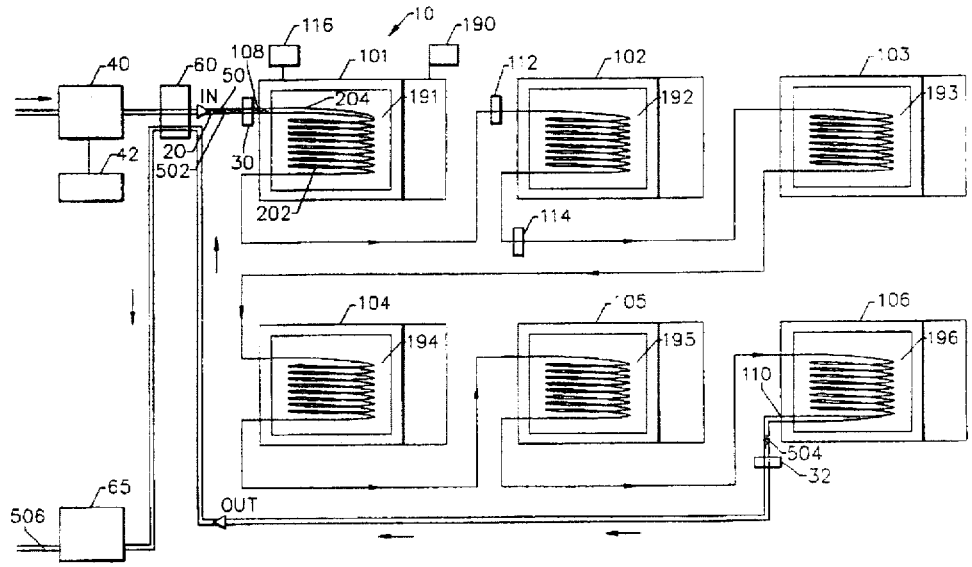

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 9 and 20 are cancelled.

Claims 1, 4, 6, 10, 17 and 21 are determined to be patentable as amended.

Claims 2, 5, 7, 8, 11–16, 18, 19 and 22–27, dependent on an amended claim, are determined to be patentable.

New claims 28–31 are added and determined to be patentable.

1. A method for pasteurizing a liquid while retaining optimum flavor, the method comprising the steps of:
   continuously flowing the liquid *through microwave transparent tubing extending* sequentially through a plurality of chambers having interiors; and
   heating the [interiors of the] *liquid in the tubing extending through the* chambers with microwave energy *in each chamber* to raise the temperature of the liquid to a predetermined final temperature, *with* the total microwave power and resident time in the chambers being sufficient to pasteurize the liquid, and the rate of temperature increase in the liquid through the *tubing in each* [chambers] *chamber* being insufficient to cause a detectable loss of flavor in the liquid.

4. The method recited in claim [3] *1*, wherein the tubing within each chamber is formed into coils, the tubing having a wall, thereby increasing the potential volume of liquid within each chamber while simultaneously maintaining a maximum depth of liquid from the tubing wall.

6. A method for pasteurizing citrus juice while retaining optimum flavor, the method comprising the steps of:
   continuously flowing the juice through a system comprising *microwave transparent tubing for receiving the juice, the tubing extending through* at least six chambers having interiors connected in series, one chamber comprising a final chamber;
   determining a desired final juice temperature to be attained, the desired temperature determined to be sufficiently high to inactivate undesirable microorganisms and enzymes, including bacteria and pectin methylesterase, and sufficiently low to avoid causing substantial deterioration of flavor in the juice;
   heating the [interiors] *interior* of the *tubing in each of the* chambers with microwave energy;
   sensing the temperature of the juice *passing through the tubing* in the final chamber; and
   controlling the flow of the juice through the [system] *tubing* in response to the sensed temperature in order to attain the desired final temperature of juice in the tubing of the final chamber, *the total microwave power and resident time in the chambers being sufficient to* pasteurize the juice, and the rate of temperature increase in the juice through the tubing in each chamber being insufficient to cause a detectable loss of flavor in the juice.

10. The method recited in claim [9] *6*, wherein the tubing within each chamber is formed into coils, the tubing having a wall, thereby increasing the potential volume of juice within each chamber while simultaneously maintaining a maximum depth of juice from the tubing wall.

17. A system for pasteurizing citrus juice while retaining optimum flavor, the system comprising:
   at least six microwave chambers;
   means [for] *including* a [continuously] *continuous* length of microwave transparent tubing extending serially through all of microwave chambers for sequentially flowing the juice through [at least six] *all of the* chambers [connected in series], one chamber comprising a final chamber;
   means for heating the [interiors] *interior* of *the tubing in* the chambers with microwave energy;
   means for sensing the temperature of the juice in the final chamber; and
   means for controlling the flow of the juice through the *tubing in the* chambers in response to the sensed temperature *and for controlling the total microwave power and resident time in the chambers to achieve a rate of temperature increase in the juice through the tubing in each chamber* in order to attain a desired final temperature of juice in the *tubing of the* final chamber, the desired final juice temperature determined to be sufficiently high to inactivate undesirable microorganisms and enzymes, including bacteria and pectin methylesterase, and sufficiently low to avoid causing substantial deterioration of flavor.

21. The system recited in claim [20] *17*, wherein the tubing has a wall and the tubing within each chamber is formed into a coil, thereby increasing the potential volume of juice within each chamber while simultaneously maintaining a maximum depth of juice from the tubing wall.

28. A method for pasteurizing a liquid while retaining optimum flavor, the method comprising the steps of:
   providing plural microwave chambers;
   extending a continuous length of microwave transparent tubing through each microwave chamber between an inlet at a first one of the chambers and an outlet at a last one of the chambers;
   continuously flowing the liquid through the length of tubing between the inlet and the outlet;
   treating the liquid with microwave energy at each chamber;
   sensing the temperature of the liquid flowing through the tubing; and
   controlling the rate of flow of the liquid through the tubing, the total microwave power and the resident time of the liquid in the chambers in response to the sensed temperature to achieve a rate of temperature increase in the liquid through the tubing in each chamber in order to obtain a desired final temperature of liquid in the final chamber, the desired final liquid temperature determined to be sufficiently high to inactivate undesirable microorganisms and enzymes, including bacteria and pectin methylesterase, and sufficiently low to avoid causing substantial deterioration of flavor.

29. The method recited in claim 28, wherein the liquid is citrus juice and further comprising the step of applying microwave energy at a predetermined power requirement and controlling the liquid flow through the tubing at a predetermined flow rate, the predetermined power requirement and the predetermined flow rate represented by the relationship of a power requirement on the order of about six kilowatts and a predetermined flow rate on the order of about sixty gallons per hour.

30. The method recited in claim 28 wherein the tubing in each microwave chamber is in the form of a coil.

31. The method recited in claim 28 wherein the liquid is passed through at least six microwave chambers.

* * * * *